United States Patent [19]

Allen

[11] Patent Number: 5,555,415
[45] Date of Patent: Sep. 10, 1996

[54] OBJECT ORIENTED EVENT MESSAGE DISPATCHING SUBSYSTEM AND METHOD UTILIZING A DISPOSITION MATRIX

[75] Inventor: Arthur D. Allen, Mountain View, Calif.

[73] Assignee: Metasphere, Inc., Los Altos, Calif.

[21] Appl. No.: 179,251

[22] Filed: Jan. 10, 1994

[51] Int. Cl.$^6$ ................................. G06F 9/40; G06F 9/44
[52] U.S. Cl. ............................................. 395/700; 395/650
[58] Field of Search ................................... 395/200, 500, 395/600, 650, 700

[56] References Cited

U.S. PATENT DOCUMENTS

| 5,303,375 | 4/1994 | Collins et al. | 395/650 |
| 5,345,587 | 9/1994 | Fehskens et al. | 395/650 |

*Primary Examiner*—Kevin A. Kriess
*Assistant Examiner*—Dennis M. Butler
*Attorney, Agent, or Firm*—Flehr, Hohbach, Test, Albritton & Herbert

[57] ABSTRACT

An event dispatching subsystem pre-processes event messages received by an event driven main system having a context consisting of a defined set of major and minor state variables each having a defined range of values. The event dispatching subsystem defines a set of ports, and bands within each port, where each distinct type of event message that can be received is assigned to a respective one of the ports and bands. The messages in each band are stored in a FIFO queue until the messages in the band are processed. Each band has an assigned priority, which imposes a processing priority order on the messages stored in the various bands, and a band status value. An event dispatcher considers one event message at a time, where the event message to be considered is selected in accordance with the priority values of those bands, if any, having a band status value indicating that processing of events messages stored in the band is enabled. The dispatcher selects a disposition for the selected event based on the event's parameter values and the state variable values for the main system. The event dispatcher executes one of a plurality of predefined disposition action procedures, selected in accordance with the selected event disposition, for disposing of each event message. At least one of the disposition action procedures that can be invoked for event messages received by each port sends event messages to the main system for further processing.

10 Claims, 11 Drawing Sheets

| Cursor Methods: ⌐128 | Cursor Attributes: ⌐130 |
|---|---|
| open()<br>close()<br>add_port()<br>delete_port()<br>add_band()<br>delete_band()<br><br>reset()<br>new_event()<br>cache_event()<br>propose_event()<br>scatter_event()<br>accept_event()<br>decline_event()<br>convert_event()<br>enq_event()<br>jam_event()<br>deq_event()<br>defer_band()<br>enable_band()<br>flush_band()<br>flush_bands()<br>flush_port()<br>test_event_guards()<br>resubmit_declined_events() | cursor mutex semaphore<br>entity lock<br>state<br>chart state change<br>current event<br>current disposition<br>current event parameter<br>current_band / EOB<br>current_port<br>port_list<br>priority queue<br>event_cache<br>guarded_band_list (*)<br>declined_band_list (**)<br>candidate_event_guard(s)<br><br>Notes:<br>The cursor is a minor state variable.<br>EOB means End-of-bands.<br>(*) (**): lists used to improve the efficiency of the test_event_guards() and resubmit_declined_events() primitives, which are executed with high frequency (1/event). |

FIGURE 3

| Port Attributes ⌐132 | Band Attributes ⌐134 |
|---|---|
| Port ID<br>Port type<br>list of bands | Band ID<br>port type<br>port<br>FIFO of (event, parameter)<br>qty_events<br>State (Fig 6A)<br>ProposalState (Fig 6B)<br>priority<br>(list of) event guard(s)/null |

FIGURE 4

OBJECT ORIENTED EVENT MESSAGE DISPATCHING SUBSYSTEM AND METHOD UTILIZING A DISPOSITION MATRIX

A portion of the disclosure of this patent document contains materials to which a claim of copyright protection is made. The copyright owner has no objection to the facsimile reproduction by anyone of the patent document or the patent disclosure, but reserves all other rights whatsoever.

The present invention relates generally to protocol management systems and methods for receiving and pre-processing event messages directed to an object or system that incorporates a specified state chart.

BACKGROUND OF THE INVENTION

There are numerous computer and communications systems that receive and process messages based on a specified protocol that defines a set of actions and responses that such systems will make in response to every possible event message received by those systems. Typically, the protocol treats the underlying system as a state machine and the manner in which each incoming message is handled is a function of (A) the content of the message, and (B) the current state of the system state machine.

While this basic model appears straightforward, the state machines used to model real computer and communication systems are often complicated, and it has become almost impossible to generate software that accurately implements the incoming message protocols—i.e., that actually handles all possible combinations of internal states and incoming messages in accordance with the protocol specification. Implementing incoming message protocols is so difficult because the number of possible combinations of internal states and incoming messages is often so vast that it is virtually impossible for a human computer programmer to cover all possible contingencies in accordance with the specified protocol using prior art programming techniques.

The present invention solves the problem of generating a program that implements complicated protocols by providing a model or framework that makes it relatively straightforward to define the actions to be taken for all possible combinations of internal states and incoming messages. The program produced using the present invention is an software object "interface" or protocol subsystem that uses a set of tables and function arrays for determining the disposition of all events received by a specified software object or computer system.

BACKGROUND INFORMATION ON STATE MACHINES

A state machine (also referred to as an automaton) can be characterized by its states and state transitions. A state machine is in one and only one state at a time, as reflected by the integer value of its (major) state variable. Additional state information is stored in minor state variables. Major and minor state variables are members of a "context record," the contents of which represents the state of a given state machine instance.

A state machine executes whenever one of a finite set of known events is submitted. The first event to be submitted causes the state machine to undergo initialization and enter a designated starting state. Subsequent event submissions are typically associated with external occurrences such as the arrival of new data, the invocation of an interface primitive, or the timeout of a timer. The typical practice prior to state machine entry is to scatter relevant event parameters associated with the event (e.g. message fields, function call arguments), and also the event identifier, into minor state variables within the context record. This and other related forms of event processing are discussed in more detail below.

A boolean guard (also known as a predicate) is herein defined to mean a boolean expression that can be evaluated without any side effects. These expressions can involve major and minor state variables and global variables. An example of a boolean guard is:

$$\text{guard}=(\text{MinorStateA}==A1 \;\&\&\; \text{GlobalX}==1) \| \text{GlobalX} \neq 1$$

which states that the guard is True if the global variable X is unequal to 1, or if the global variable X is equal to 1 and the minor state variable MinorStateA is equal to A1. When the guard function evaluates to True, the action guarded by the boolean guard will be allowed to proceed.

An action is herein defined to mean an expression or procedure that is intended to have side effects. In particular an action (i.e., performed by the interface of a first software object) can assign values to minor state and global variables, or engage the interfaces of other software objects.

In a Mealey Machine a state transition is defined by the ordered tuple (tag, sequence number, from_state, enabling event set, guard, action, to_state).

While in from_state, whenever an enabling event is announced and the guard evaluates to True, the transition fires: the event is then consumed, the specified action is invoked, and the to_state is entered. A transition with a non-empty enabling event set is termed an event-driven transition. Transitions that loop back to the from_state are called self-transitions. A guard-only transition is one with an empty enabling event set. The order in which transitions within a given state are considered is determined by their individual firing sequence number. Every state machine must include at least one entry transition that specifies the starting state. These transitions are defined by the tuple (tag, sequence number, guard, action, first_state)

At least one entry transition must be guaranteed to fire or indeterminacy will result—a fatal error condition. The order in which entry transitions to a given state machine are considered is determined by their individual firing sequence number.

In a Moore Machine actions are attached to states rather than transitions. An entry action is invoked on entry to a state, while an exit action is invoked prior to entry to a new state. Moore and Mealey machines can be shown to have equivalent expressive power, and are sometimes combined. Nevertheless the communications community has favored use of the latter in the description of communication protocols.

State Charts

It is well known that state machines are prone to combinatorial explosion when the number of states grows large (typically six or more). The following is a brief description of a generalized state machine construct, called a State Chart, (based on the work of Dr. Harel) which promotes modularity, encapsulation, layering and step-wise refinement. State Charts can be characterized as follows:

1) Any state may be refined into one or more subordinate parallel state machines.

2) Entry into a state causes one entry transition per nested state machine to fire. If there are N such state machines, the single state is effectively refined into a vector of N nested or child states. Entry transitions fire only when the parent is entered, not otherwise.

3) Whenever a state is exited, all subordinate state machines are rendered inactive.

4) A transition from a given state to a subordinate state of another state is not permitted, as this would violate the principles of modularity and layering. Appropriately formulated entry transitions (with predicates) serve this purpose instead. The reverse is not true: direct transitions to higher level states are permitted so long as these are to direct ancestors or siblings of direct ancestors.

5) State machines are traversed in a depth-breadth sequence. Execution of a "layer n state machine" continues so long as there are transitions eligible to fire. An event can be consumed only once in a given state machine. In the case of N parallel state machines subordinated to a common state, the event may be consumed N times, once per machine. An event consumed within a layer n machine is no longer available for consumption when control reverts to layer n−1.

Diagrammatic Conventions

State machines are amenable to diagrammatic representation, as depicted, for example, in FIGS. 6 and 7. States are represented by rectangles, ovals or circles while transitions are shown as directed arcs linking one state to another. Every transition is annotated by a fractional expression, the numerator of which holds the enabling event set and guard, and the denominator holds the action specification. The firing sequence number may also be required in ambiguous configurations. In dense, complex drawings each transition will typically be represented by its name tag, which may also appears in trace statements whenever the transition fires. Entry transitions are shown as dangling arcs that terminate in a state.

SUMMARY OF THE INVENTION

The present invention is an event dispatching subsystem and method for pre-processing event messages received by an event driven main system having a context consisting of a defined set of major and minor state variables each having a defined range of values. The event dispatching system defines a set of ports, and bands within each port, where each distinct type of event message that can be received is assigned to a respective one of the ports and bands. The messages in each band are stored in a FIFO queue until the messages in the band are processed. Each band has an assigned priority, which imposes a processing priority order on the messages stored in the various bands, and a band status value.

An event dispatcher considers one event message at a time, where the event message to be considered is selected in accordance with the priority values of those bands, if any, having a band status value indicating that processing of events messages stored in the band is enabled. The dispatcher selects a disposition for the selected event based on the event's parameter values and the current state variable values for the main system.

The event dispatcher executes one of a plurality of predefined disposition action procedures, selected in accordance with the selected event disposition, for disposing of each event message. At least one of the disposition action procedures that can be invoked for event messages received by each port sends event messages to the main system for further processing.

Each band for receiving and storing event messages has an associated status. The defined band status values include at least one band status value indicating that processing of event messages stored in a band is enabled and at least one band status value indicating that processing of event messages stored in the each band is disabled. The dispatcher includes a propose event procedure for selecting one of the received event message to process, wherein the selected message is selected in accordance with the priority values of those bands, if any, having a band status value indicating that processing of events messages stored in the associated band is enabled.

The event dispatcher utilizes a disposition matrix that includes an array of cells, including cells for all possible combinations of event message types and all possible values of the major state variables. Each cell stores a disposition indicia corresponding to one event message type and one possible value of one of the major state variables. In a preferred embodiment the disposition indicia in each cell is either a numeric disposition value (called the "rank" in the preferred embodiment), or a pointer to a disposition function in a list of disposition functions. Each disposition function generates a disposition value as a predefined function of a specified event message and the major and minor state variables.

The dispatcher includes a disposition mapping procedure for determining the disposition values of all cells in the disposition matrix corresponding to the port type of the port which received a specified event message, the event message type of the event message, and the current values of the major state variables. The disposition mapping procedure evaluates the disposition values of those cells which contain pointers to disposition functions by evaluating those disposition functions. The disposition mapping procedure selects one of the evaluated disposition values in accordance with predefined selection criteria (e.g., the largest disposition value) to generate a selected disposition value. The dispatcher then selects and initiates execution of the disposition action procedure corresponding to the selected disposition value so as to process the received event message.

When the selected disposition is to decline the event, the band in which the event is stored is disabled from sending additional events to the event dispatcher until the band is re-enabled. If the declined event invokes a guard function, the band is re-enabled when the guard function evaluates to True. Otherwise, the band is re-enabled whenever a major state variable of the main state chart changes value.

BRIEF DESCRIPTION OF THE DRAWINGS

Additional objects and features of the invention will be more readily apparent from the following detailed description and appended claims when taken in conjunction with the drawings, in which:

FIGS. 3 and 4 depict method primitives and state machine attributes utilized by the preferred embodiment.

DESCRIPTION OF THE PREFERRED EMBODIMENTS

Tables 1–4 at the end of the specification contain pseudocode representations of software procedures relevant to the present invention. The pseudocode used in these appendices is, essentially, a computer language using universal computer language conventions. While the pseudocode employed here has been invented solely for the purposes of this description, it is designed to be easily understandable by any computer programmer skilled in the art. The computer programs in the preferred embodiment are written in the C language.

Figure 1:
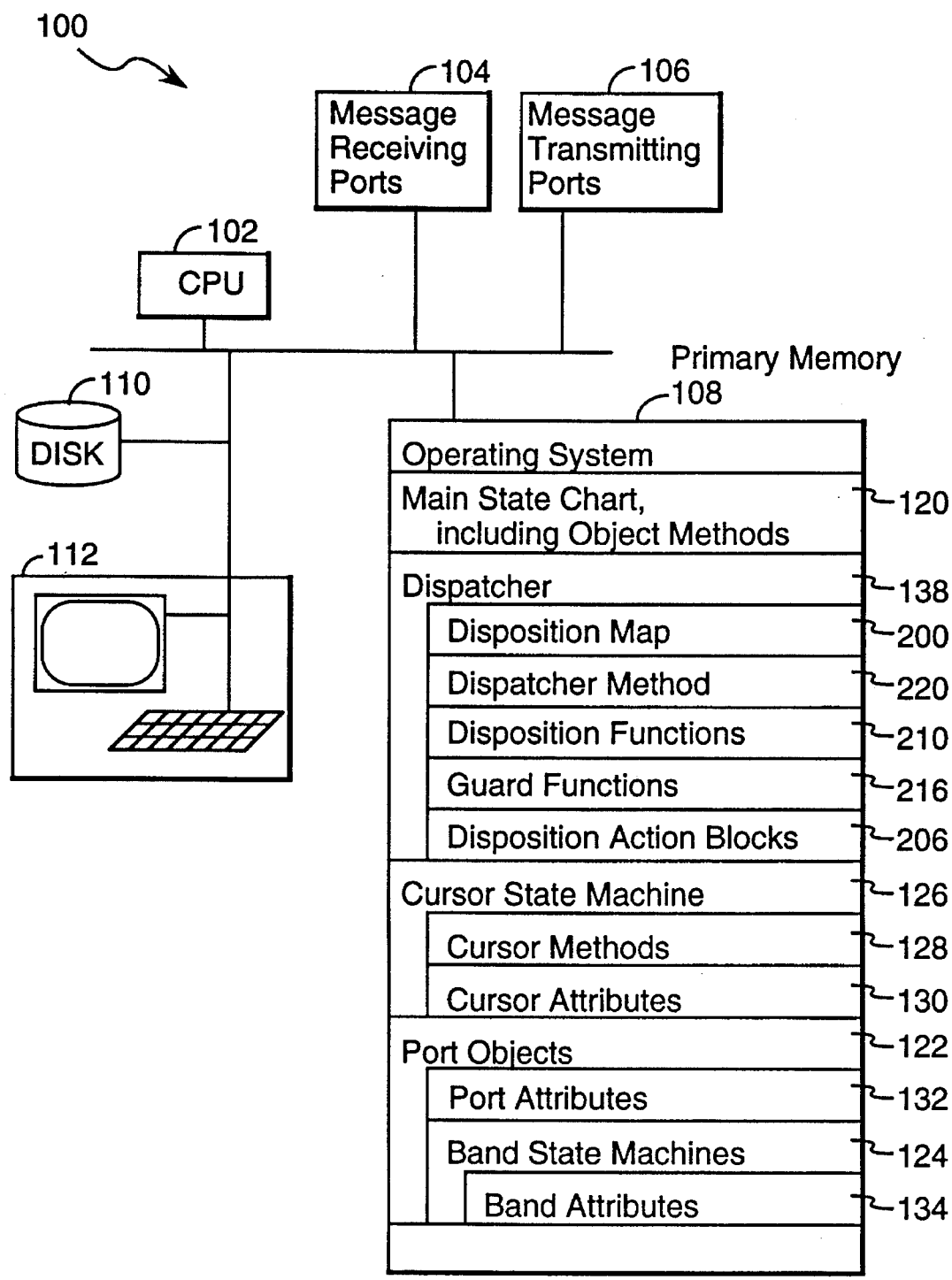
FIG. 1 is a block diagram of a computer system incorporating the present invention.

Referring to FIG. 1, the present invention is preferably implemented on a conventional computer system 100 having at least one central processing unit 102, at least one port 104 for receiving messages, at least one port 106 for transmitting messages to other computers or devices, a primary memory (random access memory) 108, secondary memory 110 (e.g., typically magnetic and/or optical disk storage subsystems), and a user interface 112. The receiving and transmitting ports 104 and 106 may be combined in a single physical interface, such as a network interface or a telephone interface, although such interfaces will generally include signal receivers and transmitters.

Referring to FIGS. 1, 2, 3 and 4 the software executed by the computer system 100 includes a main state chart 120, which includes the primary set of methods executed by an "object". The main state chart 120 also includes a context record containing major and minor state variables that define the state of the main state chart. The present invention provides a set of "port objects" 122 (hereinafter called "ports") that are the initial repositories for received event messages. Each port 122 includes one or more band state machines 124 (also called "bands"). Each received event message is received by a particular port 122 and is assigned to a particular band 124 in that port in accordance with predefined criteria, such as the event message type and parameters in the event message.

A construct herein called the "cursor" or "cursor state machine" 126 is used to keep track of the set of events waiting in the various bands to be processed. The cursor 126 also keeps track of which band and which event in each band is the next event to be processed.

A set of cursor methods 128 are used to create and delete port objects, to create and delete bands within the ports, as well as to manipulate the events stored in the bands and to manipulate the status of the bands, as will be discussed in more detail below. The set of attributes 130 associated with the cursor state machine are listed in FIG. 3, and will be discussed in more detail below.

Referring to FIG. 4, a set of port attributes 132 are stored to keep track of all the defined pods. The port attributes stored for each defined port include a unique Port ID, a Port Type, and a list of bands in the port.

Figure 2:
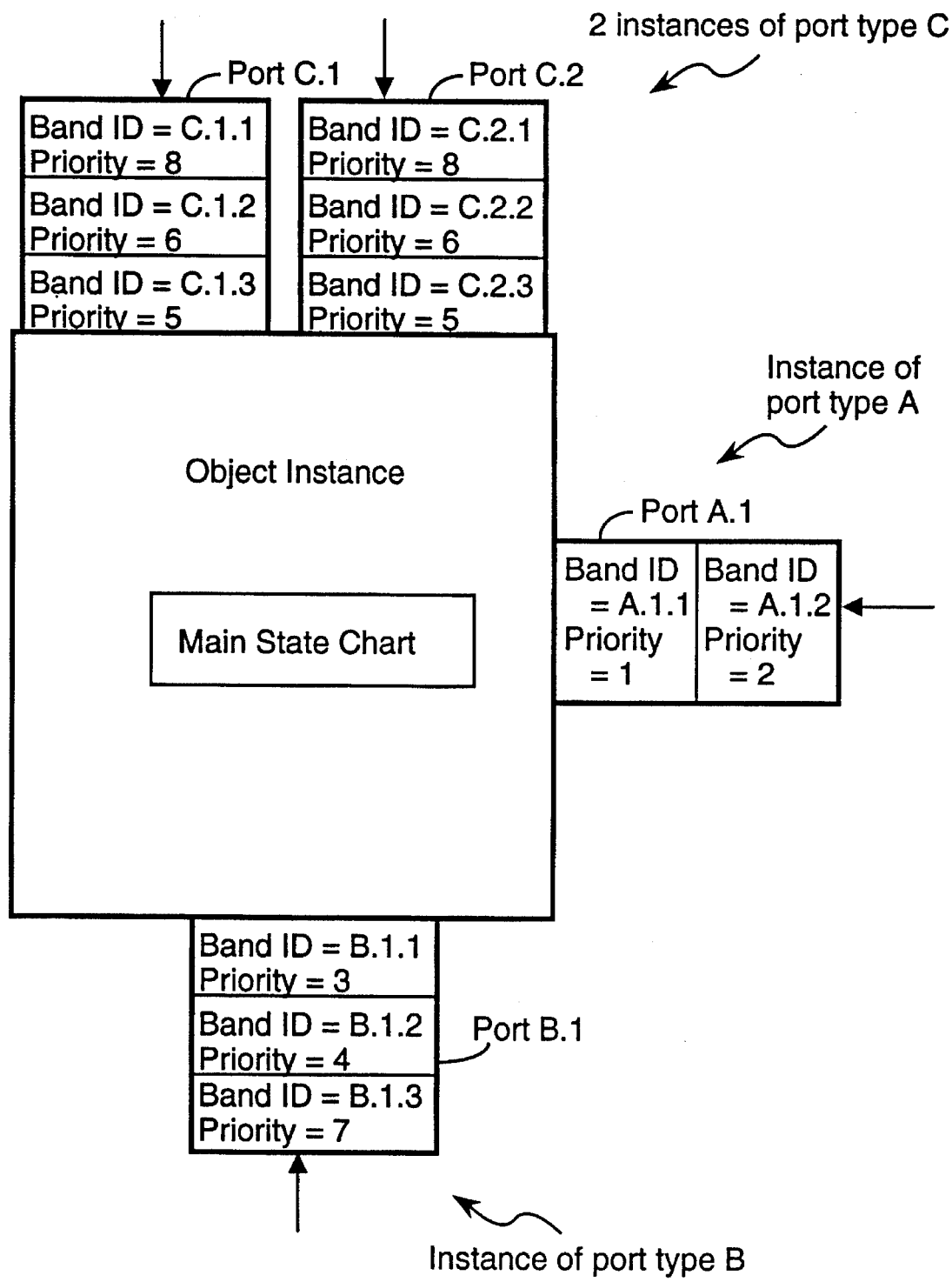
FIG. 2 is a conceptual depiction of an event driven object and its ports for receiving event messages.

As shown in FIG. 2, there can be more than one port of a specified type, and each port can have more than one band, with each band in a port having a specified priority. The object shown in FIG. 2 has two ports (C.1 and C.2) of type "C", one port (B.1) of type "B" and one port (A.1) of type "A". Each port of type "C" has three bands, each with a distinct assigned priority value. The port of type "B" has three bands (B.1.1, B.1.2, and B.1.3) and the port of type "A" has two bands (A.1.1 and A.1.2).

A set of band attributes 134 are stored to keep track of the defined bands. The band attributes stored for each defined band include:

a unique Band ID;

the port type of the port in which the band is located;

the identity of the port in which the band is located;

a FIFO buffer for storing a list of events waiting to be processed;

a "qty_events" counter that indicates the number of events stored in the band's FIFO buffer;

a state variable indicating the current state of the band (as will be discussed below with reference to FIGS. 6A and 6B);

a "proposal state" variable indicating whether the oldest event in the band's FIFO buffer has previously been submitted to the dispatcher 138 for processing (see FIG. 6B), as will be discussed below;

a priority value, indicating the processing priority for the events in this band; and a list of event guards, which comprises zero or more boolean expressions which must evaluate to True before any of the events in the band's FIFO buffer can be submitted to the dispatcher 138 for processing.

Figure 5:
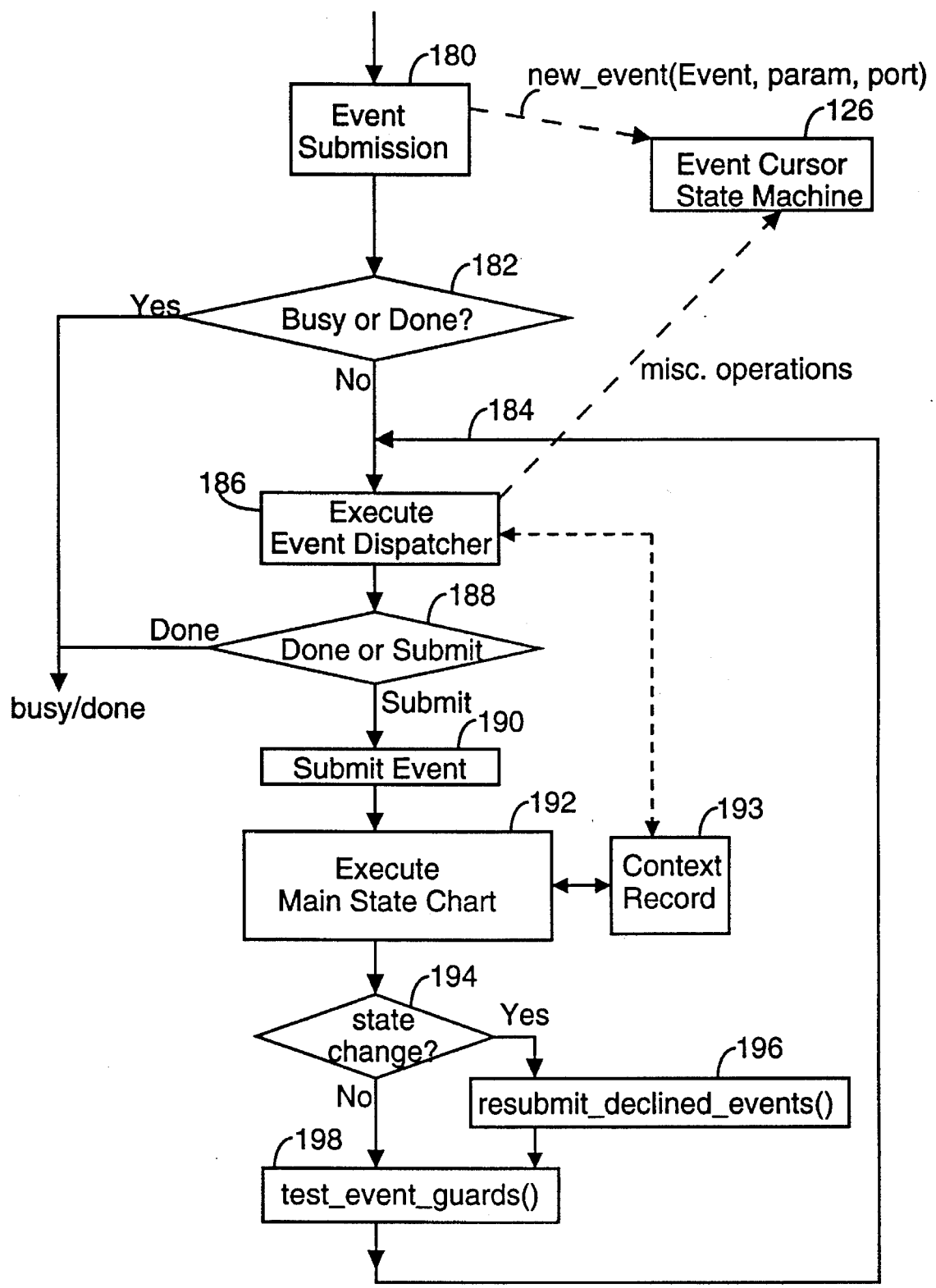
FIG. 5 is a top level flow chart of the method of operation of the preferred embodiment.

Referring to FIGS. 1 and 5, the collection of state machines comprising a state chart can be embedded within a larger computational framework which is particularly suited to the implementation of event driven objects or protocol entities. The present invention adds to the main state chart elements herein called ports 122, bands 124, an event cursor 126, and an event dispatcher 138.

Ports

Referring to FIG. 2, a port is a channel for events (i.e., event messages) to and from the main state chart. The set of events associated with a port, together with associated event parameter formats and allowed usage sequence define a distinct protocol interface. In the present invention, all incoming events are associated with an input port, and within each port, with a particular event band. Each band has an associated priority that governs the order in which a set of pending events are processed. For example, if there are pending events in a first band with a priority value of 1 and there are also pending events in a second band with a priority value of 8, the events in the band with a priority value of 1 are processed first. Events within a given band are always serviced in first-in-first-out (FIFO) order.

A port typically has a physical basis which is the actual source of event stimulus. For example, a port will typically correspond to an event or message queue, or an application program interface (API). The underlying physical resources can be engaged in ad-hoc fashion, or by means of a virtual pod object with well defined service interfaces. A pod conveying events across an API is synchronous in nature, and requires no message queuing. By contrast, a message queue may involve event queuing and event prioritization within bands. Every pod will typically have an associated event recognizer, that is, one or more procedures responsible for mapping a physical occurrence into a corresponding event value.

Band State Machine

Figure 6A:
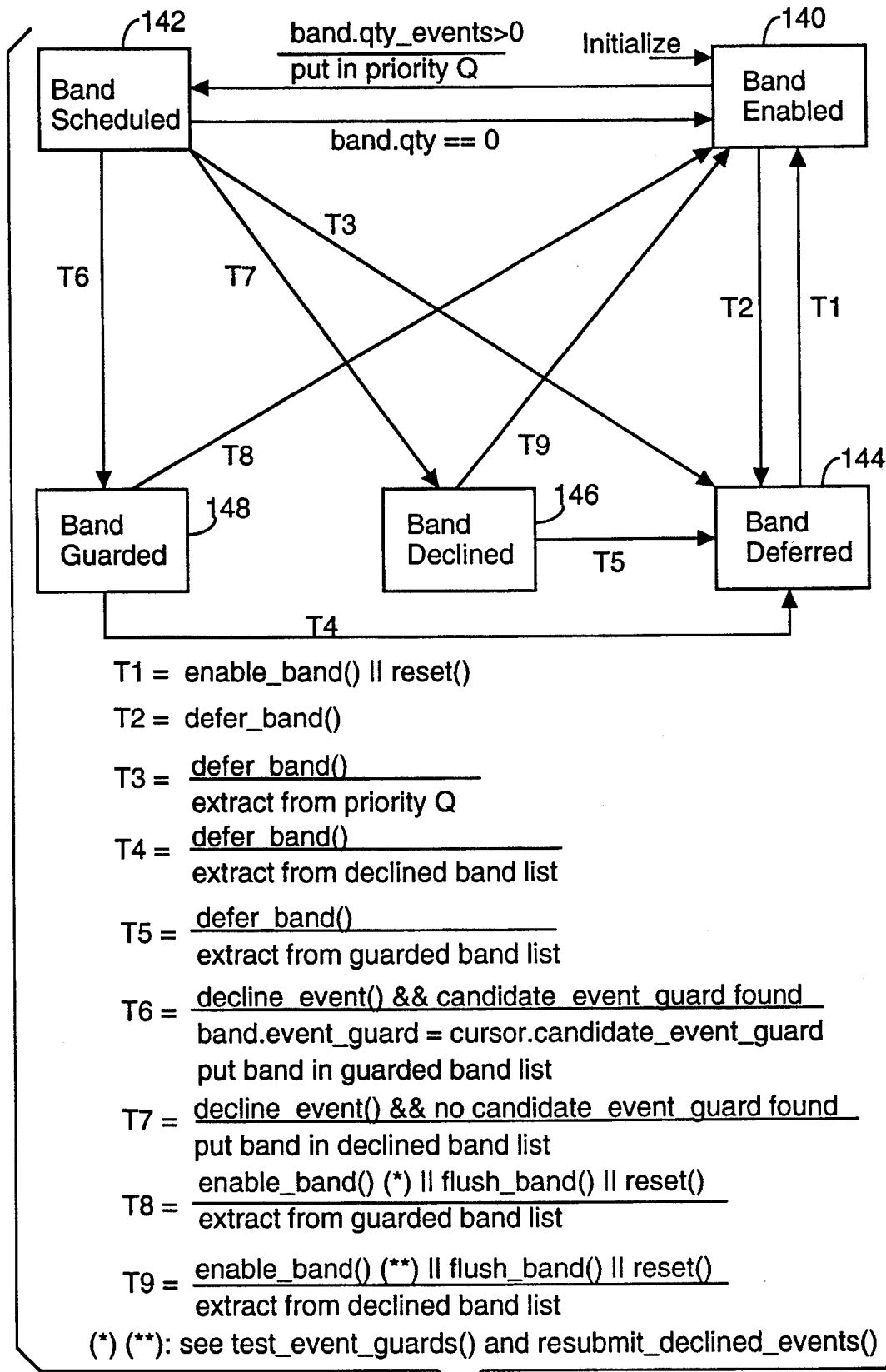
FIGS. 6A and 6B depict a band state machine used in the preferred embodiment of the present invention.
Figure 6B:
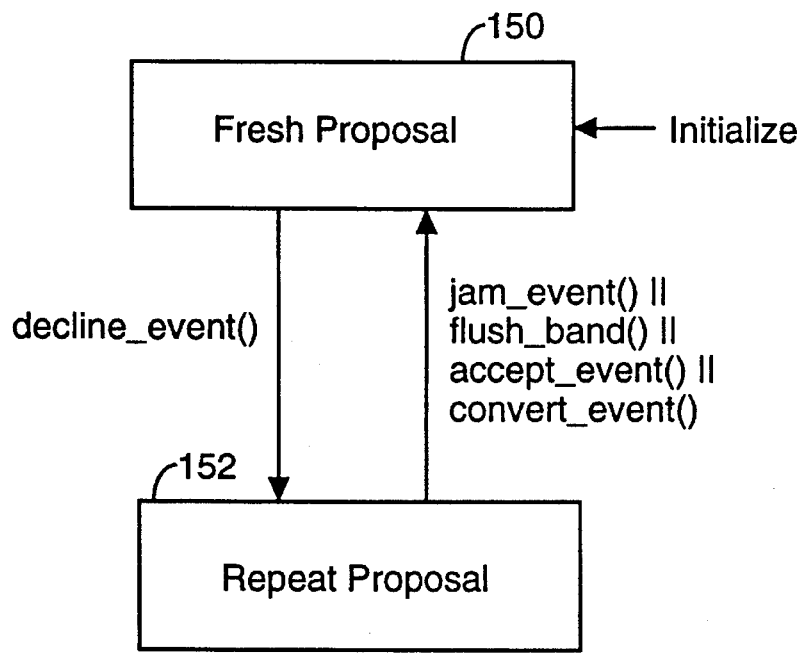

Referring to FIGS. 6A and 6B, each band comprises two parallel state machines. The primary band state machine, shown in FIG. 6A, has five states:

Band Enabled 140, which is the state of a band when the band has zero events in its FIFO buffer and is not deferred;

Band Scheduled 142, which is the state of a band that has at least one event in its FIFO buffer when the band is not blocked (i.e., not deferred, declined or guarded) from sending events to the main state chart;

Band Deferred 144, which is the state of a band having zero or more events in its FIFO buffer, and which has been blocked by the execution of a "defer_band( )" command (e.g., executed by the dispatcher 138 or the main state chart);

Band Declined 146, which is the state of a band having at least one event in its FIFO buffer, and which has been blocked by the execution of a "decline_event( )" command (e.g., executed by the dispatcher 138); and Band Guarded 148, which is the state of a band having at least one event in its FIFO buffer, and which has been blocked by the execution of a "decline_event( )" command (e.g., executed by the dispatcher 138) due to an associated boolean guard evaluating to value of False.

As noted earlier, each transition in the state transition diagrams in this document is annotated by a fractional expression, the numerator of which holds the enabling event set and/or guard, and the denominator (if any) of which holds the action specification. In these expressions, the symbol "||" is the boolean "OR" operator, the symbol "&&" is the boolean "AND" operator, and the symbol "?" is the boolean "NOT" operator. Thus, the enabling event set associated with transition expression T8, is execution of the enable_band( ) command, or execution of the "flush_band ( )" command or execution of the "reset( )" command.

The band state machine transitions T8 and T9 in FIG. 6A are generally initiated by execution of the "resubmit_declined_events( )" and "test_event_guards( )" procedures. Those procedures, shown in pseudocode form in Tables 1 and 2, will be discussed in the section of this document entitled "Event Dispatching using the Event Cursor".

The secondary band state machine, shown in FIG. 6B, relates to event parameter scatter (see FIG. 9) and has two states:

Fresh Proposal 150, which is the state of a band when the band has zero events in its FIFO buffer, or when the top event in its FIFO buffer has not been declined; and Repeat Proposal 152, which is the state of a band when the top event in its FIFO buffer has been declined by the dispatcher 138 and the associated event parameters, if any, have already been scattered to minor state variables.

Cursor State Machine

Events are announced from outside an object using the function new_event( ), together with any arguments associated with the announced event, and an indication of the port of origin. It is assumed for the purposes of this document that the software object to which the announced event is sent is a single threaded object, meaning that it can handle only one thread of execution at a time.

Figure 7A:
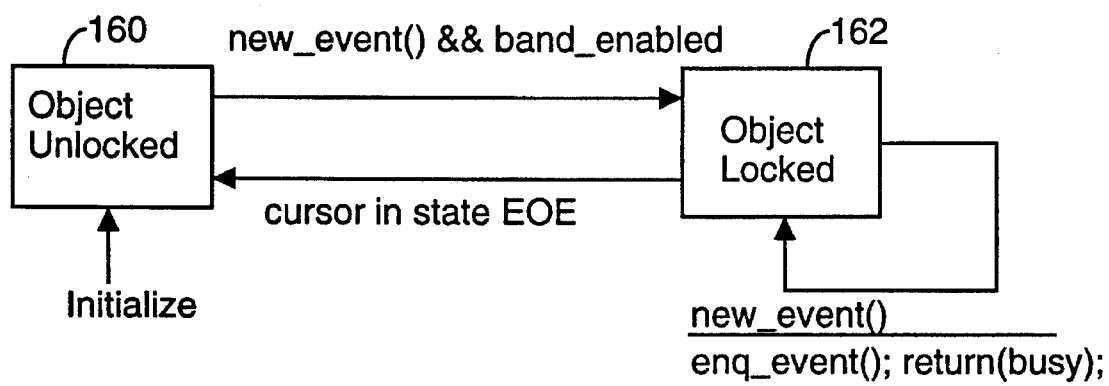
FIGS. 7A and 7B depict the cursor state machine used in the preferred embodiment of the present invention.

Whenever an object is currently locked by another thread of execution, the response to an announced event depends upon the nature of the object's pods. When an object's pods comprise a synchronous interface, the announcing thread waits until the object is unlocked by its current owner before proceeding. When an object's pods comprise an asynchronous interface, the event and its parameters are enqueued in the associated pod and band, and a busy indication is returned. FIG. 7A corresponds to the cursor state machine for use in objects having asynchronous pods.

Figure 7B:
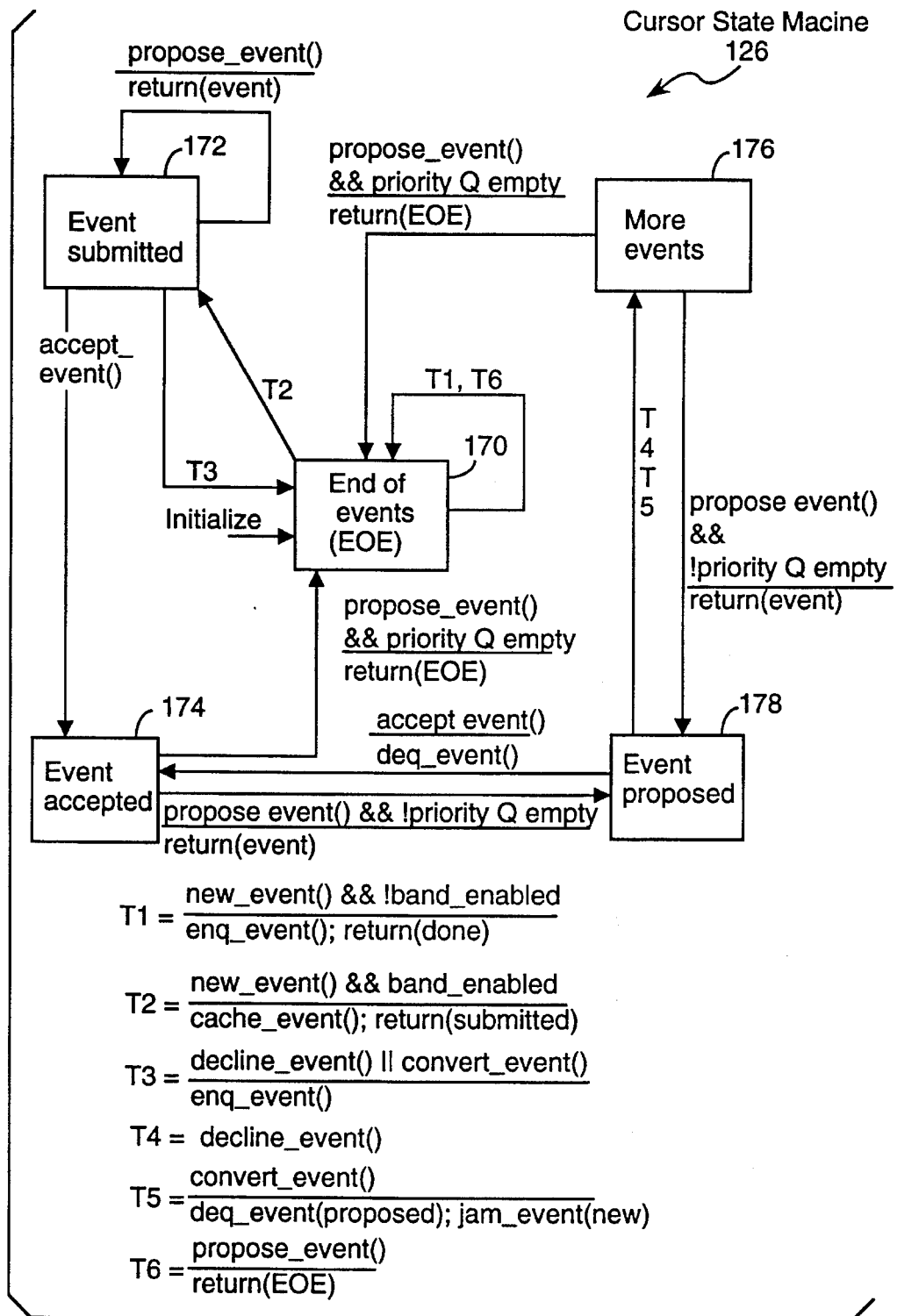

Referring to FIGS. 7A and 7B, the cursor comprises two parallel state machines. The corsor's "object lock" state machine, shown in FIG. 7A, is used only when the object's pods are asynchronous pods. When an event is received by an asynchronous pod of a locked object, the event and its parameters are enqueued in the associated pod and band, and a busy indication is returned. The band in which the event is enqueued is then Scheduled (see FIG. 6A) unless the band is deferred, declined or guarded. The object lock state machine has two states:

Object Unlocked 160, which is the state of the cursor when the priority queue is empty, which means that there are no events waiting to be processed in scheduled bands;

Object Locked 162, which is the state of the cursor when an event is received for an enabled band or any events are stored in scheduled bands.

Referring to FIG. 7B, the purpose of the main cursor state machine is to draw events from the scheduled bands in the order specified by the band priorities, and to "propose" each drawn event to the dispatcher 138 whenever the propose_event( ) command is executed. The main cursor state machine, shown in FIG. 7B, has five states:

End of Events (EOE) 170, which is the state of the cursor when there are no scheduled bands and thus no events to propose to the dispatcher.

Event Submitted 172, which is the state of the cursor when a new event is received by an enabled band and the cursor was previously in the End of Events state. For efficiency, the event and its arguments are stored in the event cache.

Event Accepted 174, which is the state of the cursor after an event is accepted by the dispatcher. If the accepted event is stored in a band, the event is de-queued from the band by execution of the deq_event( ) command, and if the accepted event is stored in the event cache, the deq_event( ) command is not executed.

More Events 176, which is the state of the cursor when an event has been declined or converted until a new proposed event is requested.

Event Proposed 178, which is the state of the cursor when an event is proposed and the priority queue is not empty.

Referring to FIG. 3, the cursor state machine maintains two lists that facilitate processing of the frequent re-evaluation of guarded bands and declined bands. In particular, the cursor maintains a list of guarded bands, cursor.guarded_band_list, and a list of declined bands, cursor.declined_band_list.

Cursor Methods

The cursor methods are also herein called primitives or commands. The primary cursor methods that are called by the dispatcher 138, by the main state chart, and by processes sending events to the object, are as follows:

New_event( ) is the procedure called by a process sending an event to the object. New_event( ) stores the received event message in the port and band associated with the message whenever the object is locked or the receiving band is not enabled. Otherwise new_event( ) invokes the cache_event( ) primitive, which causes the received event to be submitted to the event dispatcher. New_event returns one of three possible values: busy, done or submitted.

Cache_event( ) is a procedure for storing a single received event in a one-event cache when the priority queue is empty and the band associated with the received event is enabled. The purpose of the event cache is to speed the processing of event messages when the priority queue is empty.

Propose_event( ) returns the first event in the highest priority scheduled band to the event dispatcher 138. If the priority queue is empty, and the event cache is also empty, the propose_event( ) command does not return an event to the dispatcher 138, and instead returns the value "EOE". The propose_event( ) command is the procedure used by the cursor to look through the port and band data structures to locate the highest priority event that is in a scheduled band or in the event cache.

Scatter_event( ) parses an event the first time it is proposed and "scatters" the parameters of the event that may be relevant to evaluating disposition functions and guard functions. The scattered parameters are stored in the context record 193.

Accept_event( ) causes the previously proposed event to be de-queued from its band or the event cache. Execution of the accept_event( ) command also triggers state transitions in the cursor state machine 126.

Deq_event( ) removes a proposed event from the band in which it was stored. This is a low level primitive, typically called by accept_event( ) or convert_event( ).

Decline_event( ) is called when the disposition selected by the dispatcher is to decline the proposed event, which means that the event will be processed at a later time. When an event is declined, the associated band becomes Declined if the selected event disposition did not have an associated boolean guard; the associated band becomes Guarded if the selected event disposition does have an associated boolean guard.

Convert_event( ) is called when an event needs to be converted into a different event. This is typically used for error processing an erroneous event.

Jam_event( ) takes an event that was accepted and puts it back at the front of its associated band. The jam_event( ) command reverses the effect of a previously executed accept_event command. It can be invoked by the dispatcher or the main state chart.

Flush_band( ) de-queues all events in a specified band. This primitive can be invoked by a disposition action or a main state transition action.

Flush_port( ) de-queues all events in all the bands of a specified port.

Defer_band( ) puts a specified band in the Deferred state. A band can be deferred by an application program or a method in the object (e.g., by a state transition action, or by a disposition action.

Enable_band( ) is the command used to enable a previously deferred, declined or guarded band.

Event Dispatching using the Event Cursor

As shown in FIG. 5, the submission of an event (step 180) causes a call of the new_event( ) primitive, which causes the event to be stored in the appropriate port and band (or in the event cache), and changes the status of the cursor state machine 126. If the result returned by the new_event( ) primitive is "busy" (see FIG. 7A) or "done" (see transition T1 in FIG. 7B) (step 182), then the receipt of the event is acknowledged with a "done" or "busy" return code. This will typically happen if the received event is associated with a band that is Deferred, Declined, or Guarded, or when the object is locked.

When the result returned by the new_event( ) call is "submitted", and when the main state chart completes its processing of an event (via path 184), then the event dispatcher is executed (step 186). As will be discussed below, the event dispatcher will process as many events in the priority queue as it can until either (A) the priority queue is empty, in which case it returns a result of "done", or (B) it processes an event that must be submitted to the main state chart. If the result returned by the event dispatcher is "done" (step 188), the main control loop exits and no further processing of events is performed until a new event stimulus is received.

The execution of the dispatcher 138, and how the disposition of each event in the priority queue is determined by the dispatcher, is discussed in more detail below in the section entitled "The Method of Dispositions".

When the dispatcher 138 returns a result of "submit" (step 188), the last event considered by the dispatcher is submitted to the main state chart (step 190), which will process and consume the event (step 192). The operation of the main state chart is generally not relevant to the present invention, except to note that during execution of the main state chart (or any code blocks that may precede or follow it and which have herein been included in the main state chart), the main state chart may execute various ones of the cursor commands, and thus the main state chart can change the status of the bands, and can even jam a received event back into the band from which it came or can convert the received event into a different event and then jam it into another band. It can also issue calls to new_event( ) to submit additional events to itself or to another object. The main state chart also updates a context record 193, which stores the current value of the major and minor state variables that define the state of the main state chart.

After the main state chart executes (step 192), the next step (194) is to determine if any major state variables have changed in value. A change in any major state variable is significant because the primary basis for declining events in the dispatcher is that the main state chart is not in an appropriate state to receive certain events. Therefore, when any major state variable changes value, all the declined event bands are enabled by calling the resubmit_declined_events( ) command (step 196).

As shown in Table 2, the resubmit_declined_events( ) command enables each of the declined bands by executing the enable_band( ) command for each band listed in the cursor.declined_band_list data structure. Each enabled band is automatically removed from the cursor.declined_band_list data structure by execution of the enable_band( ) command, and thus the cursor.declined_band_list data structure is empty after execution of the resubmit_declined_events( ) command.

Each enabled band is automatically removed from the cursor.declined_band_list data structure by execution of the enable_band0 command, and thus the cursor.declined_band_list data structure is empty after execution of the resubmit_declined_events( ) command.

In addition, each time the main state chart consumes an event (regardless of whether or not a major state variable has changed value), the test_event_guards0 command is executed (step 198) so as to re-evaluate the boolean guard functions for all guarded bands. The rationale for this is that execution of the main state chart and the dispatcher may affect minor state variables, and the guard functions for guarded bands are often a function of the minor state variables. Thus, the boolean guard functions for all guarded bands are re-evaluated each time an event is consumed by the main state chart.

As shown in Table 1, the test_event_guards( ) procedure accesses each band listed in the cursor.guarded_band_list data structure. For each such band, the test_event_guards( ) procedure evaluates the boolean guard function or functions stored in the band.event_guard data structures associated with the guarded band. If any of the guard functions for the band evaluate to a value of True, then the enable_band( ) function is executed for that band, causing the band to become a scheduled band.

The Method of Dispositions

Only the simplest of protocols is prepared to accept any event in FIFO order, irrespective of its port of origin. As the complexity of a "stateful object" grows, with a concomitant rise in number of states, events and input ports, effective management of event stimulus under all conditions becomes a major challenge. The present invention offers a powerful data driven solution to this problem, called "The Method of Dispositions".

According to this method, every port is endowed with a set of dispositions that describe the full range of responses the state chart may exhibit to any of its associated events. An object designer or protocol implementor is free to define the set of dispositions and disposition semantics as appropriate for each port. Each such set must include the ACCEPT disposition, the significance of which will become apparent shortly.

A disposition is defined as an ordered tuple:

(label, integer ID, rank, action block)

The rank values assigned to a set of dispositions must establish a strict ordering among all dispositions defined for a port type. Each disposition action block contains program statements (expressions involving major and minor state variables) that define the disposition semantics. Thus, a disposition action block may call any of the cursor procedures (e.g., to decline an event (causing it to be deferred), or to convert an event) and may also pass an event to the main state chart by calling the appropriate procedure for submitting the event to the main state chart (e.g., using the procedure call "accept(event)").

The default disposition is normally the one with the lowest assigned rank. The ACCEPT disposition arises for a given event E and state S whenever event E enables at least one transition originating in S, i.e., the event is expected. Dispositions other than ACCEPT become relevant when event E in is NOT expected in state S, or when all transitions enabled by event E in state S have a guard attached (guarded disposition). Whenever ACCEPT is not appropriate (as determined by the state chart topology) the default disposition is used unless otherwise specified by a protocol implementor as needed to shape the event stimulus response in a desired fashion. One such override involves the system defined NEUTRAL disposition, which must always be assigned the lowest rank whenever it is used. In such cases, the disposition assigned the next higher rank becomes the default disposition. When used, the NEUTRAL disposition causes the state chart to be desensitized to a given event in a given state. It can therefore be used whenever there is a need to observe or track events submitted to the state machine non-intrusively. One application of the NEUTRAL disposition is protocol verification.

Figure 8:
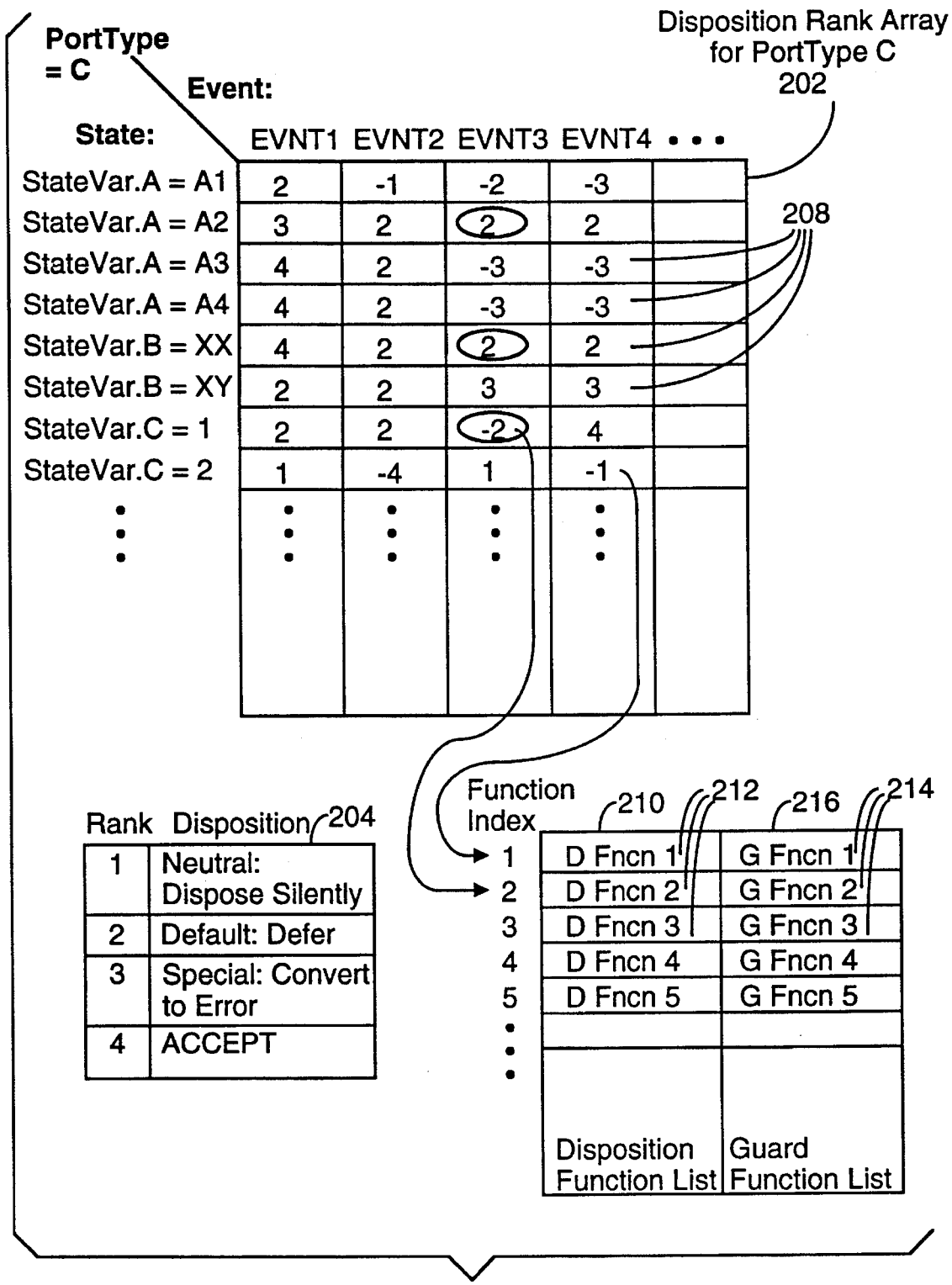
FIG. 8 represents the disposition rank array for a particular port type and the disposition function and guard function lists referenced by entries in the disposition rank array.
Figure 9:
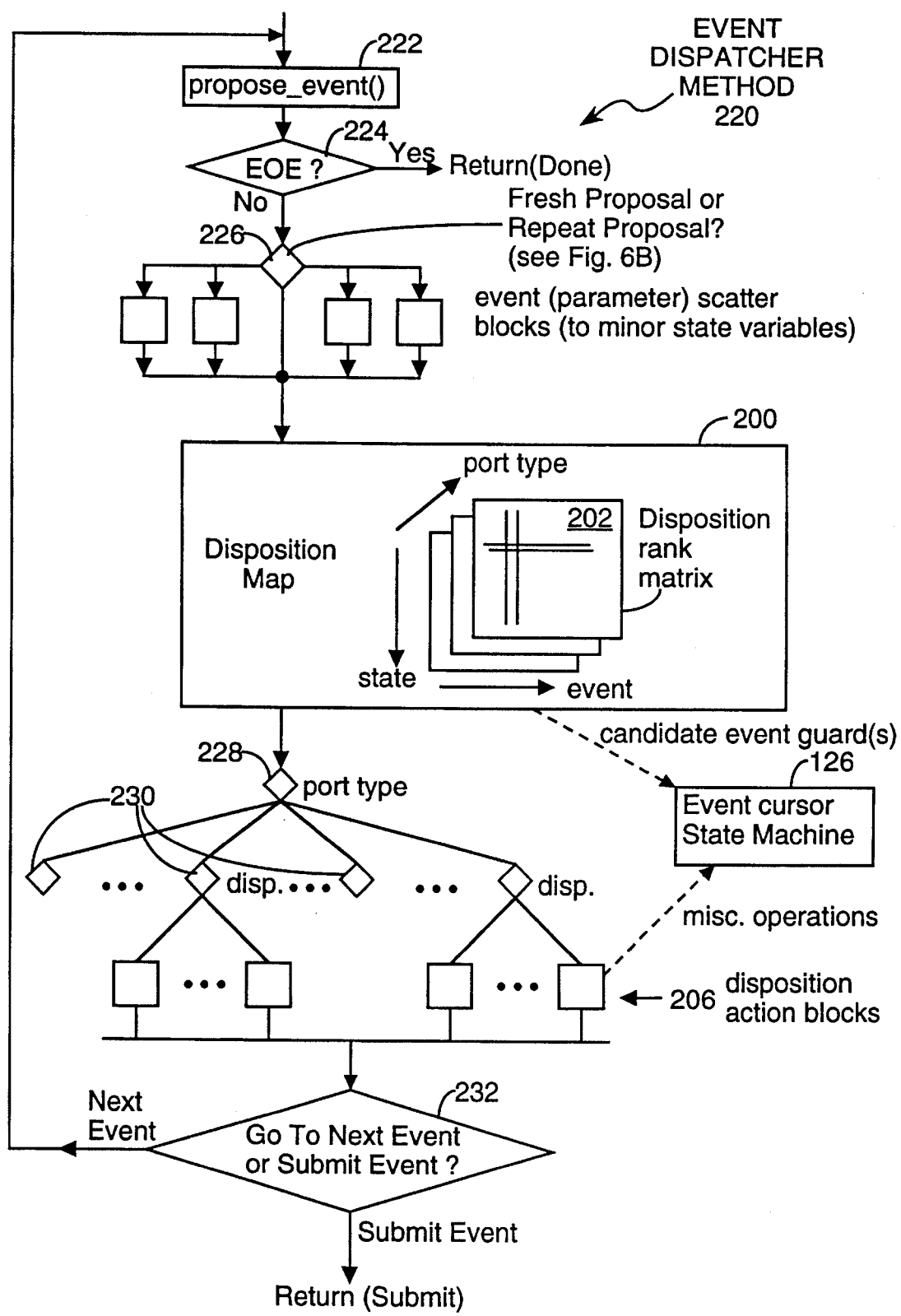
FIG. 9 is a flow chart of the event dispatcher used in a preferred embodiment of the present invention.

Referring to FIGS. 8 and 9, in the present invention the Event Dispatcher 138 uses a Disposition Rank Matrix 200 (also herein called the Disposition Map) to determine the disposition of a protocol entity to a proposed event while in a given state. The disposition rank matrix 200 contains a two-dimensional array 202 of rank values for each port type, and thus is a three dimensional array. Specifically, the matrix cell value given by rank=disposition_matrix[port_type][event][state]

is the rank of that disposition relative to other dispositions defined for the port of event origin. The actual disposition value can be obtained by function composition, as follows:

rank=disposition_matrix[port_type]event][state]

disposition=rank_to_disposition(rank)

where rank_to_disposition( ) is an array 204 that translates rank values into dispositions. The selected disposition is executed by calling the appropriate action block:

call(action_block(port_type,disposition,event,return_code))

where "action_block( )" represents the set of disposition action blocks 206 in the Event Dispatcher 138.

Each matrix cell 208 represents the rank of the disposition for a particular event when the main state chart is in a particular state. Since a state chart can have multiple active states at any one time, an event is evaluated with respect to all the active states by determining the rank of the matrix cells for each cell corresponding to the proposed event and each of the active states. In the example shown in FIG. 8, there are at least three active state machines with associated state variable (StateVar.A, StateVar.B and StateVar.C). When an event EVNT2 is proposed to the dispatcher, it determines the rank values for EVNT2 for each of the currently active states (State.A=A2, State.B=XX and State.C=1) by accessing the corresponding cells of the disposition rank array for the port type of the port from which EVNT2 is received. The disposition for the event is the highest rank value obtained from the applicable matrix cells.

As will be understood by those skilled in the art, if each defined event can only arise from a single port type, a single two-dimensional disposition rank array can be employed instead of a three-dimensional matrix.

Typically, for any port, only a small number of disposition ranks need to be defined. In general the dispositions must include at least one rank value for the default disposition and one rank value for the "accept event" disposition. Additional dispositions for some ports may include a "dispose silently" disposition, a "convert event" disposition, or a "defer event" disposition. One of these is typically used as the default disposition.

Each action block may return one of two values: "next event", whenever the last event to be considered has been fully processed and a new event may be considered; and "submit", which causes the last event to be considered to be submitted to the main state chart.

For any disposition matrix cell that has a positive value, the cell value is equal to the rank assigned to that cell. However, for any disposition matrix cell that contains a negative value, the cell value acts as a pointer to a disposition function 212 in a disposition function array 210. Each disposition function 212 returns a disposition rank value according to the values of major and minor state variables—the latter not being knowable at compile time (i.e., by definition, minor state variables are not knowable from the major state variables at the time the disposition map is generated for a particular object interface).

For each disposition function 212, there is a corresponding boolean guard function 214 stored in guard function array 216. The boolean guard function evaluates to "True" only for the set of conditions (i.e., values of major state variables, minor state variables and global variables) under which the corresponding disposition function 212 returns the rank value for the ACCEPT disposition. Whenever a disposition function 212 is evaluated as part of the disposition map evaluation process, if the disposition function does not return a rank equal to the rank for the ACCEPT disposition, then the corresponding boolean guard function becomes a "candidate guard function" for the band corresponding to the currently proposed event. Whenever the highest ranking disposition rank is produced by a disposition function, the associated guard function is selected as the candidate guard function for the band.

Utilization of the Disposition Map

Referring to FIGS. 9 and Tables 4 and 5, the event dispatcher method 220 begins (at step 222) with execution of the propose_event( ) command, which locates and returns the highest priority event in the priority queue (which comprises the event_cache and the set of scheduled bands in priority order). If the priority queue, including the event cache, is empty (step 224), the propose_event( ) command returns a value of EOE (for "end of events") and the dispatcher method exits with a return value of "done". Otherwise, processing of the event located by the propose_event( ) command begins.

The first time an event is proposed (i.e., it was not previously deferred) (step 226) the associated scatter block (if supplied) is invoked to cause relevant parameters to be scattered to associated minor state variables. At a minimum, the scattered values must include those referenced by any event guards associated with guarded dispositions covering the proposed event.

At any given time a state chart may have a number of active states, each exhibiting its own disposition to a proposed event E. The ultimate disposition of the proposed event must be obtained by a process of resolution. The disposition_map function (200), which is represented by FIG. 8 and Table 4, performs this resolution process.

Resolution proceeds as follows: each active state proposes its disposition to event E. The state exhibiting the disposition with the greatest rank prevails. This procedure is implemented within the Disposition_Map procedure (see Table 4) which, given a pointer to the context record 193 (i.e., the place in memory where the set of major and minor state variables are stored), and a proposed event and pod type, returns the selected event disposition.

Whenever the resolved disposition is not ACCEPT and moreover the highest ranking disposition has an associated boolean guard, the disposition map procedure also locates the disposition guard for use by the event cursor should the event under consideration be subject to deferral by the corresponding disposition action block 206, by way of the cursor primitive decline_event( ).

A guarded disposition is a disposition that takes effect only if the boolean guard function evaluates to False. Otherwise the disposition becomes ACCEPT. The event guard function is derived from the corresponding disposition function and is saved in cursor.candidate_event_guard when an event is not accepted. If an event is declined, the guard function is stored in the band's list of event guards. In the preferred embodiment there is only one guard per band. In an alternate embodiment, the guard functions for all the disposition functions associated with a proposed event are stored in a list, with the resulting compound guard function evaluating to True if any of the guard functions in the list evaluates to True.

The disposition map yields a selected disposition value for the event. This value and the port type of the event are used to identify an associated disposition action block 206, the statements of which implement the disposition semantics. Ultimately, an action block must either accept, decline or convert the proposed event. Only an accepted event is allowed to proceed beyond the event dispatcher. Alternatively, an event may be accepted only to be dismissed. In this case, as well as those of event conversion and declination, further event proposals are solicited by the dispatcher method.

More specifically, after the disposition map procedure is completed, the action block 206 to be executed is selected based on the port type of the proposed event (step 228) and on the event disposition (step 230) that was selected by the disposition map procedure. The selected action block 206 will return one of two values: "next event" or "submit". If the returned value is "next event" (step 232), then the dispatcher method once again calls propose_event( ) at step 222. If the returned value is "submit", the dispatcher method exits and with a return value of "submit".

Generating the Disposition Matrix

Referring to Table 7, as a practical matter, the contents of the disposition matrix can be filled in automatically by a code generator (e.g., a protocol compiler) based on analysis of the state machine topology, and natural language-like dispositions clauses specified by a programmer in a special purpose description language.

As previously, the ACCEPT disposition arises for a given event E and state S whenever event E enables at least one transition originating in S, i.e., the event is expected. If all transitions expecting E in S have a guard attached, the event guard for E in state S (used by the event cursor) can be constructed by forming a synthetic function that is the logic OR of all transition guards enabled by event E. The disposition function for E in S is synthesized in the same manner, with the difference that a disposition rank of ACCEPT is returned instead of a value of True, and another designated disposition rank is returned instead of false (as explained below).

Unless otherwise specified by a disposition clause, all matrix entries for which ACCEPT does not apply receive the default rank value. A disposition clause is any natural language-like statement used to assign one or more disposition rank values to the disposition matrix. Some examples of disposition clauses are as follows:

"for all events in bands xx, yy, when in states zz, cc, disposition is DEFER"

"for events zz, dd, regardless of state, disposition is PASS_ON"

"for all events except zz, cc, when in state ee, disposition is DISCARD_SILENTLY"

Guarded dispositions can be specified in the same fashion. For example the statement:

"for events xx, yy when in states zz, cc guarded disposition is DEFER"

causes a disposition function and event guard to be synthesized, as previously described, for every (event,state) pair (i.e., (xx,zz), (xx,cc), (yy,zz), (yy,cc)). Tautological events guards are ignored when detected. Some tautologies are knowable from an analysis of the state machine topology. Notably, if at least one transition enabled by E in a state S does not have a boolean guard, the event guard for E in S will always be true. Similarly, if a given state S has no transitions enabled by event E, the event guard for E in S is always false, and thus the event E will be declined when the main state chart is in state S. (event, state) pairs for which an event guard is appropriate receive the ACCEPT disposition unless otherwise specified by a guarded disposition clause.

Example of Software Object Interface

Figure 10:
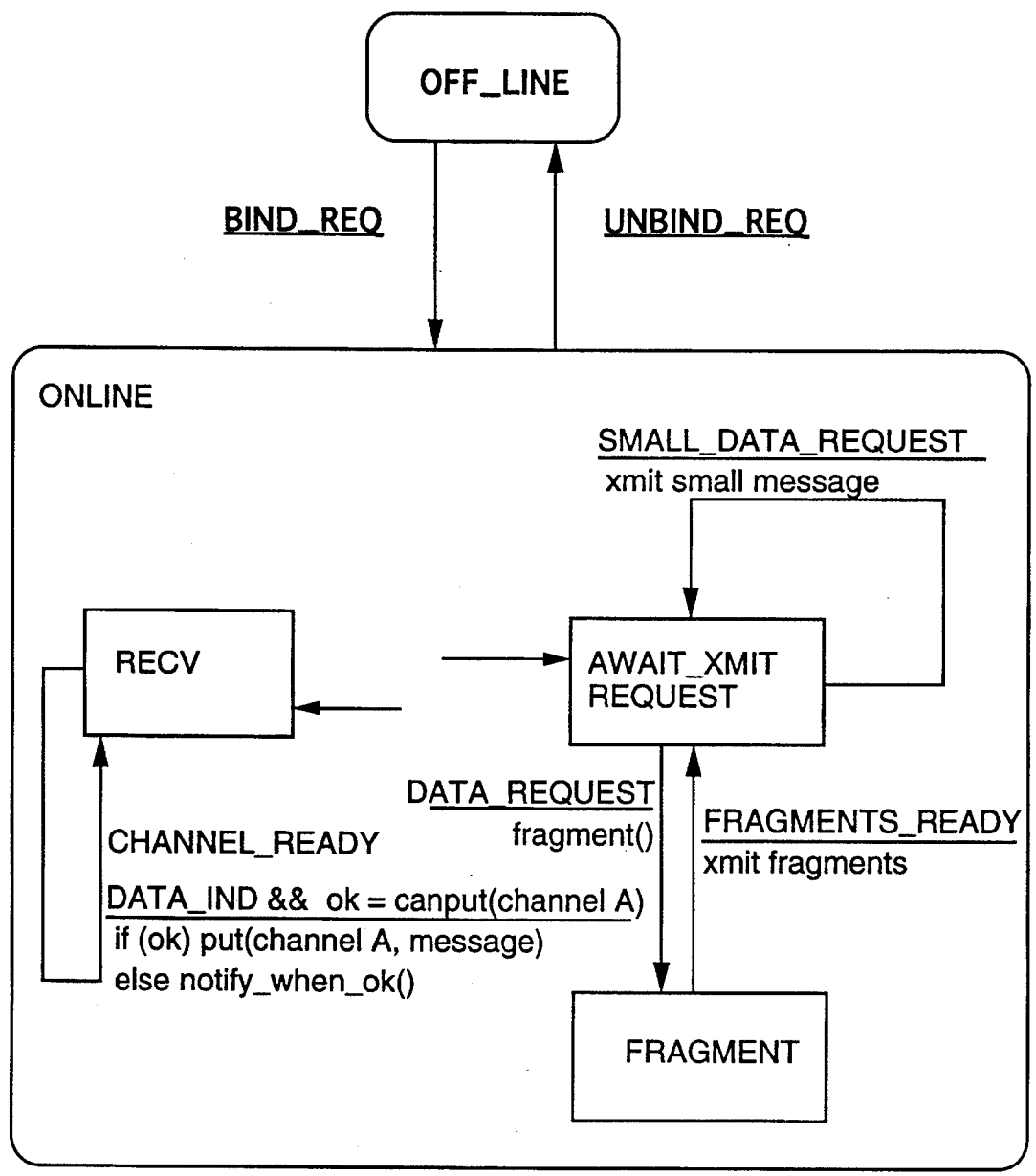
FIG. 10 is a conceptual representation of an example of an event driven object.
Figure 11:
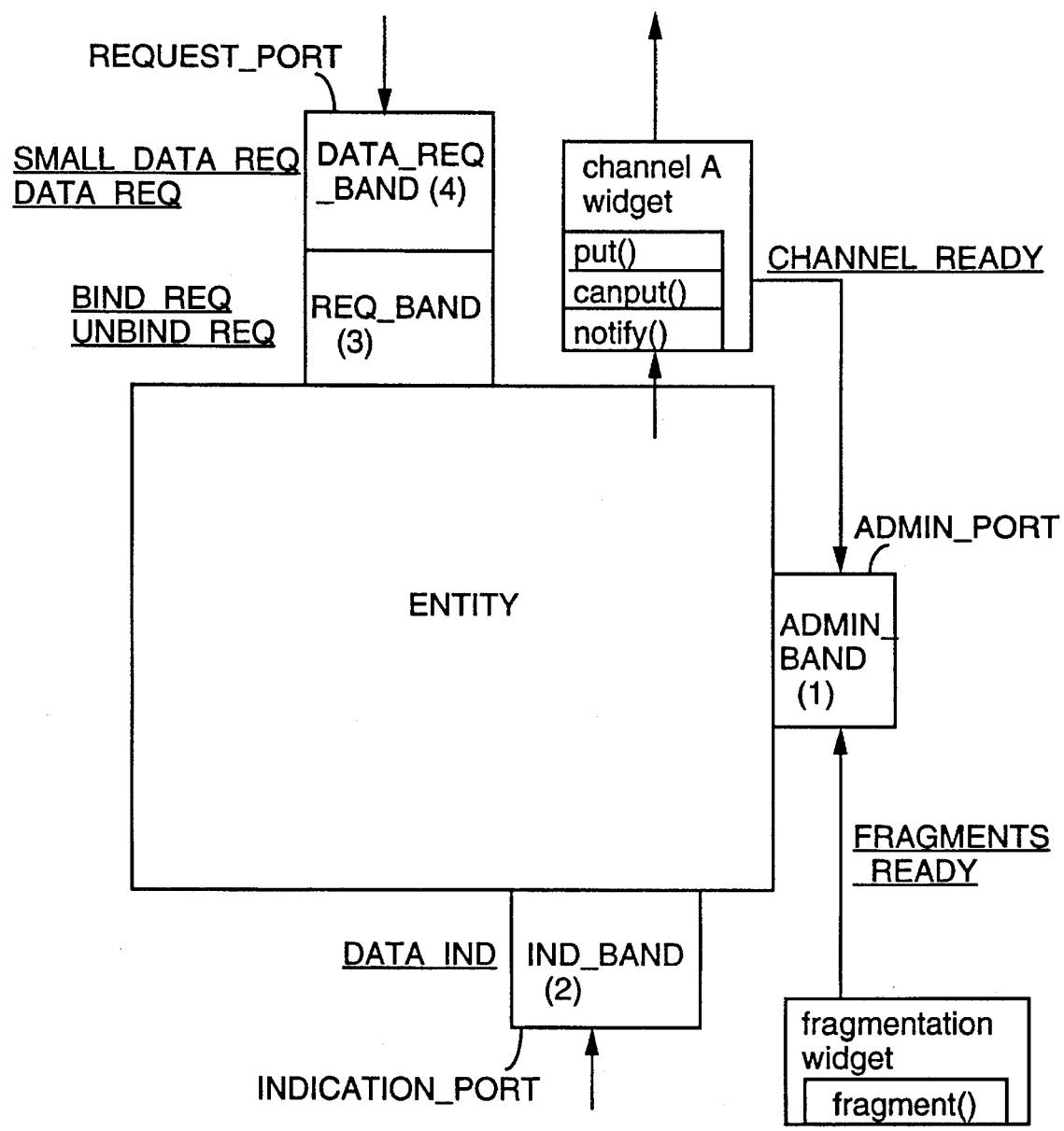
FIG. 11 is a conceptual representation of the input and output pods for the event driven object of FIG. 10.

In the example of a software object interface shown in FIGS. 10 and 11, the state chart of the system has a first state variable that is equal to ON_LINE or OFF_LINE, and a second state variable that is equal to RECV when the first state variable is equal to ON_LINE, and a third state variable equal to either AWAIT_XMIT_REQUEST or FRAGMENT. The state transition expressions for transitions between these states are shown in FIG. 10.

Ports in Example Interface

Referring to FIG. 11, the ports of the object interface in this example are the ADMIN, INDICATION and REQUEST pods, which are defined as follows:

| ADMIN Port: | |
| --- | --- |
| Bands: | ADMIN_BAND |
| | Events: CHANNEL_READY, FRAGMENTS_READY |
| Dispositions: | ACCEPT (2)> DISCARD_SILENTLY (1) |
| INDICATION Port: | |
| Bands: | IND_BAND |
| | Events: DATA_IND |
| Dispositions: | DEFER (3) > ACCEPT(2) > DISCARD_SILENTLY(1) |
| REQUEST Port: | |
| Bands: | REQ_BAND |
| | Events: BIND_REQ, UNBIND_REQ |
| | DATA_REQ_BAND |
| | Events: DATA_REQ, LARGE_DATA_REQ |
| Dispositions: | DEFER(4) > ACCEPT(3) > DISCARD_SILENTLY(2) > NAK_OUT_OF_STATE(1) |

Disposition Clauses for Interface Example

The disposition clauses used to define the contents of the disposition matrix are as follows.

General statement: Unexpected data requests are simply discarded.

Clause: on any event in band REQ_BAND, when in state OFF_LINE, disposition is DISCARD_SILENTLY.

General Statement: Incoming indications are deferred when there is insufficient channel capacity to receive them.

Clause: on event DATA_IND, when in state RECV, guarded disposition is DEFER.

General Statement: New xmit requests are deferred until the present one is fully processed.

Clause: for any event in band DATA_REQ_BAND, when in state FRAGMENT, disposition is DEFER.

Disposition Matrices for Interface Example

The disposition rank array for the ADMIN port is as follows:

| Events: | CHANNEL_READY | FRAGMENTS_READY |
|---|---|---|
| States: | | |
| OFF_LINE | 1 | 1 |
| ON_LINE | 1 | 1 |
| RECV | 2 | 1 |
| AWAIT_XMIT_REQ | 1 | 1 |
| FRAGMENT | 1 | 2 |

The disposition rank array for the INDICATE port is as follows:

| Events: | DATA_IND |
|---|---|
| States: | |
| OFF_LINE | 1 |
| ON_LINE | 1 |
| RECV | −1 (index) |
| AWAIT_XMIT_REQ | 1 |
| FRAGMENT | 1 |

The rank value of −1 in the above disposition rank array serves as an index into a table of disposition functions, only one of which is defined in this example. Specifically, the disposition function for event DATA_IND in state RECV is:

```
disp_of_DATA_IND_in_state_RECV(context)
{
    if(true = canput())
        return(2); /* i.e. rank of ACCEPT */
    else
        return(3); /* i.e. rank of DEFER */
}
```

The corresponding event guard is:

```
guard_of_DATA_IND_in_state_RECV(context)
{
    if(true = canput())
        return(true);
    else
        return(false);
}
```

The disposition rank array for the REQUEST port is as follows:

| Events | BIND_REQ | UNBIND_REQ | DATA_REQ | LARGE_DATA_IND |
|---|---|---|---|---|
| State: | | | | |
| OFF_LINE | 3 | 1 | 2 | 2 |
| ON_LINE | 1 | 3 | 1 | 1 |
| RECV | 1 | 1 | 1 | 1 |
| AWAIT_XMIT_REQ | 1 | 1 | 3 | 3 |
| FRAGMENT | 1 | 1 | 4 | 4 |

Widgets Used by Example Interface

The example interface makes use of a couple of auxiliary objects (widgets), which operate as follows. The fragmentation widget, given a long message, assembles a list of smaller fragments suitable for transmission. Completion of the fragmentation is announced via the event FRAGMENTS_READY.

The channel widget models a flow controlled communication channel. The canput( ) method returns a value of True when the channel can accommodate another message (using method put( )), and returns a value of False otherwise. The notify( ) method requests notification of available channel capacity by way of the event CHANNEL_READY.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

TEST_EVENT_GUARDS()

© Copyright 1993 Metasphere Inc.
```
/* This primitive invokes all the event guard(s) associated
   with each guarded band, and enables those for which the
   guard evaluates to True. */
test_event_guards()
{
    /* traverse guarded_band_list and enable eligible bands */
    if(is_empty(cursor.guarded_band_list))
        return
    for each band in cursor.guarded_band_list
    {
        /* For simplicity we assume at most one active event
           guard per band.
           This procedure ( and disposition_map() below)
           can easily be generalized to allow multiple active
           event guards on a single band. */
        cursor.current_band = band
        if(band.event_guard() == True)
        {
            enable_band(band)    /* see FIG. 6A */
        }
    }
    cursor.current_band = EOB
```

TABLE 1-continued

TEST_EVENT_GUARDS()

```
    return
}
```

TABLE 2

RESUBMIT_DECLINED_EVENTS()

```
/*  This primitive enables all bands in the declined band
    list, causing these to be scheduled. */
resubmit_declined_events()
{
    /* traverse declined band list and enable each band*/
    if(is_empty(cursor.declined_band_list))
        return
    for each band in cursor.declined_band_list
    {
        enable_band(band)          /* see FIG. 6A */
    }
    cursor.current_band = EOB
    return
}
```

TABLE 3

RESET()

```
/*  This primitive enables all bands, causing those holding
    events to be scheduled*/
reset()
{
    for each port in cursor.port_list
        for each band in port.band_list
            enable_band(band)
}
```

TABLE 4

DISPOSITION_MAP()

```
/*  Given an event, port type and hierarchical state of
    the state chart, this procedure returns the current state
    chart disposition to the event. Whenever the disposition is
    guarded, a candidate event guard is provided in
    cursor.candidate_event_guard for use should the event
    under consideration be subject to deferral by the disposition
    action block. */
disposition_map(event,port_type)
{
    /* If each defined event can only arise from a
    single port type, a single disposition rank matrix can be
    employed instead of multiple matrices */
    rank_matrix = matrix_of_type(port_type)
    max_rank = -1
    for each state in active_state_list
    {
        rank = rank_matrix[event][state]
        if(rank>0)
        {
            if (rank > max_rank)
            {
                max_rank = rank
                cursor.candidate_event_guard = null
            }
        }
        else                            /* guarded disposition */
        {
            table_index = -rank
            rank = disposition_function_table[table_index]()
            if(rank > max_rank)
            {
                max_rank = rank
                if(rank != rank_of(ACCEPT, port_type) )
                    cursor.candidate_event_guard =
                        event_guard_table[table_index]
                else
                    cursor.candidate_event_guard = null
            }
        }
    }
```

TABLE 4-continued

DISPOSITION_MAP()

```
    }
    return(rank_to_disposition(rank))
}
```

TABLE 5

DISPATCHER_METHOD()

```
return_code = next event
do while (return_code≠submit)
{
    propose_event(event)   /* gets topmost event
    in the priority Q, if any */
    if event == EOE
        return(done)
    else
    {
        /*  Scatter minor state variables if this is a Fresh
            Proposal */
        if Band(event).ProposalState == Fresh
        {
            if event has parameters that need to be scattered
                scatter_event(event)
        }
        /*  Select the Disposition of the Received event
            message */
        port_type = event's port type
        Disposition = disposition_map(event,port_type)
        /*  Execute the Action Block associated with the
            Selected Disposition. Return_code will equal
            "next event" or "submit" */
        call Action_Block(port_type,Disposition,event,return_
        code)
    }
}  /* end of do while loop */
return(submit)
```

TABLE 6

ACTION_BLOCK EXAMPLES

```
ACCEPT(event):
{
    accept(event)         /* Submit to main state chart */
    return_code=submit
    return
}
CONVERT(event)
{
    convert_event(event,new_event_type)
    return_code=next event
    return
}
DEFER(event):
{
    decline_event(event)       /* See FIGS. 6A and 7B */
                               /* Sets Band to Declined
                                  or Guarded */
    return_code=next event
    return
}
DISCARD_SILENTLY(event):
{
    accept_event(event)        /* Remove event from band */
    copy(event,AuditTrail)     /* Store record of event in
                                  audit trail file */
    return_code=next event
    return
}
```

TABLE 7

BUILD DISPOSITION MATRIX

```
/* Define Matrix Arrays for all port types */
    Set DefaultRank
    for each port_type
        {
        Generate Array(port_type,#states,#defined events)
        Fill all Array entries with DefaultRank
        for each event E in port_type
            for each state S
                if event E is expected in state S
                    array(port_type,S,E) = ACCEPT
        }
/* First pass through disposition clauses */
FunctionNo = 0
for each disposition clause having a disposition function
    {
    FunctionNo = FunctionNo + 1
    compile Disposition Function
    generate corresponding Guard Function
    store Disposition Function and Guard Function in
    Disposition and Guard Function Arrays in
    slot=FunctionNo
    }
/* Second pass through disposition clauses */
for each disposition clause
    {
    if disposition clause has a disposition function
        {
        rank = -1 × FunctionNo for the disposition
        function
        Set specified matrix cells to rank
        }
    else
        {
        Rank = rank associated with specified disposition
        set specified matrix cells to Rank
        }
    }
```

What is claimed is:

1. A memory for storing data for access by programs being executed on a data processing system, said data processing system including a main system having a context consisting of a defined set of major and minor state variables each having a defined range of values, said memory comprising:

a plurality of ports for receiving said event messages, said plurality of ports including a plurality of distinct port types wherein said ports of each said port type receive event messages having event message types corresponding to said each port type;

a plurality of disposition action procedures for disposing of specified event messages; wherein at least one of said disposition action procedures is for sending said specified event messages to said main system for further processing;

a disposition matrix comprising an array of cells, each cell storing a disposition indicia corresponding to one said event message type and one possible value of one of said major state variables, said disposition matrix including cells for all possible combinations of said event message types and all possible values of each of said major state variables; and a dispatcher procedure for selecting one of said plurality of disposition action procedures to execute for a specified one of said received event messages, including a disposition mapping procedure for (A) evaluating the disposition indicia for all cells in said disposition matrix corresponding to the event message type of said one event message and current values of said major state variables so as to generate a disposition value for each evaluated cell, and (B) selecting one of said disposition values in accordance with predefined selection criteria to generate a selected disposition value;

said dispatcher procedure further for selecting and initiating execution of one of said plurality of disposition action procedures in accordance with said selected disposition value so as to process said one event message.

2. The interface of claim 1, said plurality of parts including a plurality of bands; each port in said plurality of ports including at least one said band for storing said received event messages, each band having an associated priority value and an associated subset of said event messages types corresponding to event messages to be received and stored in said each band; each band further having an associated status, wherein defined values of said band status include at least one band status value indicating that processing of event messages stored in said each band is enabled and at least one band status value indicating that processing of event messages stored in said each band is not enabled;

said dispatcher including a propose event procedure for selecting one of said received event messages, wherein said selected message is selected in accordance with said priority values associated with those said plurality of bands, if any, having a band status value indicating that processing of events messages stored in the associated band is enabled; wherein said one event message selected by said propose event procedure comprises said specified one of said received event messages for which said dispatcher selects one of said plurality of disposition action procedures to execute.

3. The computer memory of claim 1, wherein said disposition action procedures include:

a first disposition action procedure for accepting said specified one of said received event messages for submission to said main system;

a second disposition action procedure for declining said specified one of said received event messages and thereby deferring submission of said event messages to said main system; and a third disposition action procedure for disposing of said specified one of said received event messages.

4. The computer memory of claim 1, wherein each of said ports has associated therewith at least one message band that holds event messages of predefined corresponding event message types;

said dispatcher procedure assigns one of said message bands a deferred status when submission of an event assigned to said one message band is deferred, and thereafter automatically defers submission of all messages assigned to said message band until processing of event messages in said message band is enabled.

5. The computer memory of claim 4, wherein said one message band has an associated guard function associated therewith;

said dispatcher procedure, after said message band has been assigned a deferred status, assigns said one message band an enabled status and enables evaluation of said event messages stored in said one message band when said associated guard function evaluates to a predefined logical value.

6. A memory for storing data for access by programs being executed on a data processing system, said data processing system including a main system having a context consisting of a defined set of major and minor state variables each having a defined range of values, said memory comprising:

a plurality of ports for receiving said event messages, said plurality of ports including a plurality of distinct port types wherein said ports of each said port type receive event messages having event message types corresponding to said each port type;

a plurality of disposition action procedures for disposing of specified event messages; wherein at least one of said disposition action procedures is for sending said specified event messages to said main system for further processing;

a set of disposition functions, each disposition function generating a disposition value as a predefined function of a specified one of said event messages and said major and minor state variables;

a disposition matrix for storing an array of disposition values for each said port type, the array of disposition values corresponding to each port type including a first axis with entries corresponding to each event message type corresponding to said each port type and a second axis with entries corresponding to all possible values of each of said major state variables, said array comprising an array of cells, each cell storing a value for each combination of said event message type entries and said major state variable values;

wherein each value stored in said cells comprises a disposition value, or a pointer to one disposition function in said set of disposition functions; and a dispatcher procedure for selecting one of said plurality of disposition action procedures to execute for a specified one of said received event messages, including a disposition mapping procedure for determining the disposition values for all cells in said disposition matrix corresponding to the port type of the port which received said event message, the event message type of said one event message, and current values of said major state variables; said disposition mapping procedure evaluating the disposition values of those of said cells which contain pointers to ones of said disposition functions by evaluating said ones of said disposition functions, and selecting one of said determined disposition values in accordance with predefined selection criteria to generate a selected disposition value;

said dispatcher procedure further for selecting and initiating execution of one of said plurality of disposition action procedures in accordance with said selected disposition value so as to process said specified one of said received event messages.

7. The interface of claim 6, said plurality of ports including a plurality of bands; each port in said plurality of ports including at least one said band for storing said received event messages, each band having an associated priority value and an associated subset of said event messages types corresponding to event messages to be received and stored in said each band; each band further having an associated status, wherein defined values of said band status include at least one band status value indicating that processing of event messages stored in said each band is enabled and at least one band status value indicating that processing of event messages stored in said each band is not enabled;

said dispatcher including a propose event procedure for selecting one of said received event messages, wherein said selected message is selected in accordance with said priority values associated with those said plurality of bands, if any, having a band status value indicating that processing of events messages stored in the associated band is enabled; wherein said one event message selected by said propose event procedure comprises said specified one of said received event messages for which said dispatcher selects one of said plurality of disposition action procedures to execute.

8. The computer memory of claim 6, wherein said disposition action procedures include:

a first disposition action procedure for accepting said specified one of said received event messages for submission to said main system;

a second disposition action procedure for declining said specified one of said received event messages and thereby deferring submission of said event messages to said main system; and a third disposition action procedure for disposing of said specified one of said received event messages.

9. The computer memory of claim 6, wherein each of said ports has associated therewith at least one message band that holds event messages of predefined corresponding event message types;

said dispatcher procedure assigns one of said message bands a deferred status when submission of an event assigned to said one message band is deferred, and thereafter automatically defers submission of all messages assigned to said message band until processing of event messages in said message band is enabled.

10. The computer memory of claim 9, wherein said one message band has an associated guard function associated therewith;

said dispatcher procedure, after said message band has been assigned a deferred status, assigns said one message band an enabled status and enables evaluation of said event messages stored in said one message band when said associated guard function evaluates to a predefined logical value.

\* \* \* \* \*